US010558406B2

(12) United States Patent
Ishimaru

(10) Patent No.: US 10,558,406 B2
(45) Date of Patent: Feb. 11, 2020

(54) INFORMATION PROCESSOR WITH SELECTABLE PRESET OPERATIONS FOR TRANSMITTING IMAGE DATA TO VARIOUS DEVICES

(71) Applicant: Oki Data Corporation, Tokyo (JP)

(72) Inventor: Masaaki Ishimaru, Tokyo (JP)

(73) Assignee: Oki Data Corporation, Tokyo (JP)

( * ) Notice: Subject to any disclaimer, the term of this patent is extended or adjusted under 35 U.S.C. 154(b) by 27 days.

(21) Appl. No.: 15/599,874

(22) Filed: May 19, 2017

(65) Prior Publication Data
US 2017/0357469 A1 Dec. 14, 2017

(30) Foreign Application Priority Data

Jun. 9, 2016 (JP) .................................. 2016-115044

(51) Int. Cl.
*G06F 3/12* (2006.01)
*H04N 1/00* (2006.01)
(52) U.S. Cl.
CPC .......... *G06F 3/1232* (2013.01); *G06F 3/1204* (2013.01); *G06F 3/1205* (2013.01); *H04N 1/00127* (2013.01); *G06F 3/1286* (2013.01)
(58) Field of Classification Search
CPC .... G06F 3/1232; G06F 3/1204; G06F 3/1205; G06F 3/1286; H04N 1/00127
See application file for complete search history.

(56) References Cited

U.S. PATENT DOCUMENTS

| 2005/0046875 A1* | 3/2005 | Gibson | B41J 29/393 |
| | | | 358/1.1 |
| 2007/0150738 A1* | 6/2007 | Kawai | G06F 21/33 |
| | | | 713/176 |
| 2009/0195819 A1* | 8/2009 | Sugimoto | H04N 1/00413 |
| | | | 358/1.15 |
| 2017/0277483 A1* | 9/2017 | Nakamura | G06F 21/335 |

FOREIGN PATENT DOCUMENTS

| JP | 2000-174949 A | 6/2000 |
| JP | 2013256061 A | 12/2013 |
| JP | 2014179798 A | 9/2014 |

* cited by examiner

*Primary Examiner* — Christopher Wait
(74) *Attorney, Agent, or Firm* — Rabin & Berdo, P.C.

(57) ABSTRACT

An information processor includes a communicator, a memory, and a controller. The communicator communicates with a first electronic device, and thereby generates a first address parameter corresponding to the first electronic device. The memory stores a parameter set including a plurality of parameters. The parameter set is adapted to perform a first process including a process that causes the communicator to transmit data. The controller controls, on a basis of the parameter set and the first address parameter, the first process when the first address parameter is generated by the communicator.

10 Claims, 10 Drawing Sheets

151

| SETTING ITEM | SETTING VALUE |
|---|---|
| PROTOCOL | CIFS |
| SERVER NAME | PC1 |
| FOLDER PATH | Folder1 |
| FILE NAME | File.pdf |
| PORT NUMBER | 445 |
| USER NAME | XXXX |
| PASSWORD | YYYY |
| READING SIZE | A4 |
| FILE FORMAT | PDF |
| COLOR TYPE | Grayscale |
| RESOLUTION | 200dpi |

A1 (PROTOCOL through PASSWORD)
A2 (READING SIZE through RESOLUTION)

FIG. 2

| SETTING ITEM | SETTING VALUE |
|---|---|
| PROTOCOL | CIFS |
| SERVER NAME | PC2 |
| FOLDER PATH | Folder2 |
| FILE NAME | File.pdf |
| PORT NUMBER | 445 |

FIG. 8A

| SETTING ITEM | SETTING VALUE |
|---|---|
| PROTOCOL | FTP |
| SERVER NAME | PC2 |
| FOLDER PATH | Folder1 |
| FILE NAME | File.pdf |
| PORT NUMBER | 21 |

FIG. 8B

| SETTING ITEM | SETTING VALUE |
|---|---|
| PROTOCOL | HTTP |
| SERVER NAME | PC2 |
| FOLDER PATH | Folder1 |
| FILE NAME | File.pdf |
| PORT NUMBER | 80 |

FIG. 8C

| SETTING ITEM | PERMISSION OR PROHIBITION OF MAKING CHANGE | SETTING VALUE | |
|---|---|---|---|
| PROTOCOL | PERMITTED | CIFS | ⎫ |
| SERVER NAME | PERMITTED | PC1 | |
| FOLDER PATH | PERMITTED | Folder1 | |
| FILE NAME | PERMITTED | File.pdf | A1 |
| PORT NUMBER | PERMITTED | 445 | |
| USER NAME | PERMITTED | XXXX | |
| PASSWORD | PERMITTED | YYYY | ⎭ |
| READING SIZE | PROHIBITED | A4 | ⎫ |
| FILE FORMAT | PROHIBITED | PDF | A2 |
| COLOR TYPE | PERMITTED | Grayscale | |
| RESOLUTION | PROHIBITED | 200dpi | ⎭ |

INFORMATION PROCESSOR WITH SELECTABLE PRESET OPERATIONS FOR TRANSMITTING IMAGE DATA TO VARIOUS DEVICES

CROSS REFERENCE TO RELATED APPLICATIONS

The present application claims priority from Japanese Patent Application No. 2016-115044 filed on Jun. 9, 2016, the entire contents of which are hereby incorporated by reference.

BACKGROUND

The technology relates to an information processor that performs a process on information.

For example, a multi-function peripheral (MFP) having functions such as a copy function, a facsimile function, and a scanner function often requires various settings to be set upon execution of a single job. Accordingly, many of the MFPs are able to accept registration of various settings as a preset in advance, thereby reducing a load on a user. For example, Japanese Unexamined Patent Application Publication No. 2000-174949 discloses an image reading system that accepts registration of a process in a predetermined reading mode as a scan job in advance.

SUMMARY

An electronic apparatus is generally desired to have high usability for a user, and is expected to have improved usability.

It is desirable to provide an information processor that improves usability for a user.

According to one embodiment of the technology, there is provided an information processor including a communicator, a memory, and a controller. The communicator communicates with a first electronic device, and thereby generates a first address parameter corresponding to the first electronic device. The memory stores a parameter set including a plurality of parameters. The parameter set is adapted to perform a first process including a process that causes the communicator to transmit data. The controller controls, on a basis of the parameter set and the first address parameter, the first process when the first address parameter is generated by the communicator.

BRIEF DESCRIPTION OF DRAWINGS

FIG. 2 describes a configuration example of preset information illustrated in FIG. 1.

FIG. 8A describes an example of a communication setting.

FIG. 8B describes an example of another communication setting.

FIG. 8C describes an example of still another communication setting.

FIG. 10 describes a configuration example of preset information illustrated in FIG. 9.

DETAILED DESCRIPTION

Some example embodiments of the technology will be described in detail below in the following order with reference to the accompanying drawings.

1. First Example Embodiment
2. Second Example Embodiment

Configuration Example

Figure 1:
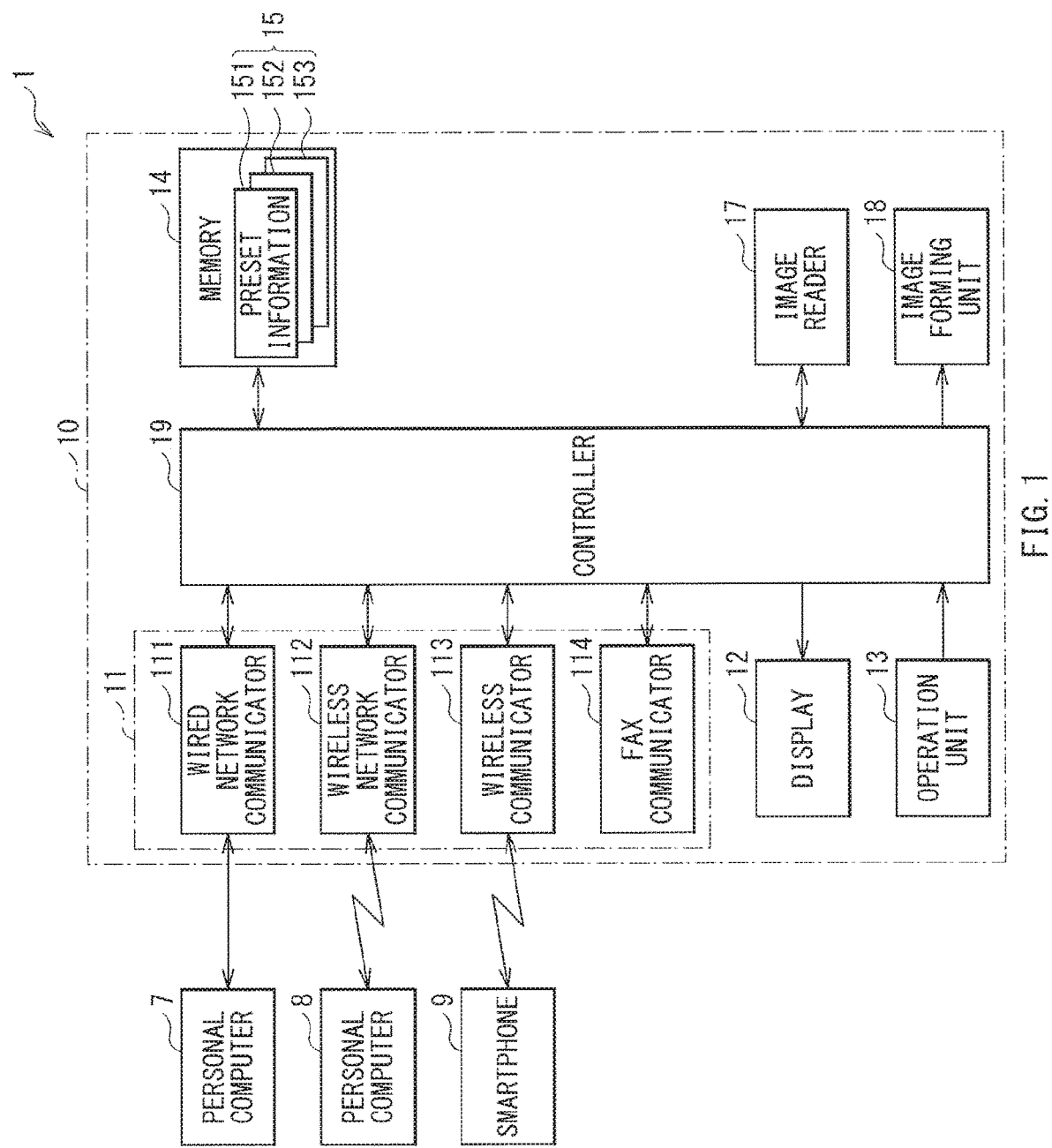
FIG. 1 is a block diagram illustrating a configuration example of an information processing system according to a first example embodiment of the technology.

FIG. 1 illustrates a configuration example of an information processing system (an information processing system 1) provided with an information processor according to a first example embodiment of the technology. The information processing system 1 may include a multi-function peripheral (MFP) 10, personal computers 7 and 8, and a smartphone 9.

The MFP 10 may include a communicator 11, a display 12, an operation unit 13, a memory 14, an image reader 17, an image forming unit 18, and a controller 19.

The communicator 11 communicates with an electronic device. By communicating with the electronic device, the communicator 11 may perform operations such as reception of print data and transmission of image data generated by the MFP 10, for example. The communicator 11 may include a wired network communicator 111, a wireless network communicator 112, a wireless communicator 113, and a fax communicator 114.

The wired network communicator 111 may communicate with an electronic device by means of a wired local area network (LAN). The electronic device with which the wired network communicator 11 communicates may be the personal computer 7 in this example. The wired network communicator 111 may communicate with the single personal computer 7 in this example; however, this is non-limiting. In one example, the wired network communicator 111 may communicate with a plurality of electronic devices.

The wireless network communicator 112 may communicate with an electronic device by means of a wireless LAN. The wireless network communicator 112 may include two communication modes M1 and M2. In the communication mode M1, the wireless network communicator 112 may operate as a wireless LAN adapter, and communicate indirectly with the electronic device via an access point. The communication mode M1 may be referred to as an infrastructure mode. In the communication mode M2, the wireless network communicator 112 may operate as an access point, and communicate directly with the electronic device. The communication mode M2 may be referred to as software enabled access point (SoftAP) mode. The electronic device with which the wireless network communicator 112 communicates may be the personal computer 8 in this example. Each of the communication modes M1 and M2 may be set to be enabled or disabled, for example. The communication mode M1 may be set to be disabled in this example for description's sake; however, this is non-limiting. Upon operating in the communication mode M2, the wireless network communicator 112 may recognize the personal computer 8 by assigning an IP address to the personal computer 8 by means of a dynamic host configuration protocol (DHCP), following which the wireless network communicator 112 may temporarily communicate with the personal computer 8 in a period from the time at which the wireless network communicator 112 recognizes the personal computer 8 to the time at which the wireless network communicator 112 and the personal computer 8 are disconnected from each other. The wireless network communicator 112 may communicate with the single personal computer 8 in this example; however, this is non-limiting. In one example, the wireless network communicator 112 may communicate with a plurality of electronic devices.

The wireless communicator 113 may communicate with an electronic device by means of Bluetooth (registered trademark) in this example. The electronic device with which the wireless communicator 113 communicates may be the smartphone 9 in this example. Specifically, the wireless communicator 113 may recognize the smartphone 9 by performing a predetermined pairing operation, following which the wireless communicator 113 may temporarily communicate with the smartphone 9 in a period from the time at which the wireless communicator 113 recognizes the smartphone 9 to the time at which the wireless communicator 113 and the smartphone 9 are disconnected from each other. The wireless communicator 113 may communicate with the single smartphone 9 in this example; however, this is non-limiting. In one example, the wireless communicator 113 may communicate with a plurality of electronic devices.

The fax communicator 114 may perform transmission and reception of data between whom the fax communicator 114 communicates with via a telephone line.

The display 12 may display, for example, a state of the MFP 10 and a menu screen. The display 12 may include a liquid crystal display, for example. The operation unit 13 may receive an operation performed by a user. The operation unit 13 may include, for example, a touch panel and various buttons.

The memory 14 may store, for example, various types of setting information of the information processing system 1 and reading data that is read from a reading medium by the image reader 17. The reading medium may be a medium to be read. The memory 14 may store a plurality of pieces of preset information 15 in this example. Specifically, the memory 14 may store, in this example, three pieces of preset information 151 to 153 which may be collectively referred to as the "preset information 15" hereinafter. Each piece of the preset information 15 may include a setting that is directed to execution of a single job. The preset information 151 may have a preset name that is set as "PRESET1", the preset information 152 may have a preset name that is set as "PRESET2", and the preset information 153 may have a preset name that is set as "PRESET3".

FIG. 2 illustrates an example of the preset information 151. The preset information 151 may be directed to execution of a so-called scan-to-server process. The scan-to-server process may involve generation of image data by reading information recorded on a reading medium and transmission of the generated image data to an electronic device. The preset information 151 may include a communication setting A1 and a reading setting A2. The communication setting A1 may be directed to transmission of the image data to the electronic device. The communication setting A1 may include settings of a protocol, a server name, a folder path, a file name, a port number, a user name, and a password, for example. In this example, the protocol may be set as "CIFS" (Common Internet File System), the server name may be set as "PC1", the folder path may be set as "Folder1", the file name may be set as "File.pdf", the port number may be set as "445", the user name may be set as "XXXX", and the password may be set as "YYYY". The reading setting A2 may be directed to reading of the information recorded on the reading medium. The reading setting A2 may include settings of a reading size, a file format, a color type, and resolution. In this example, the reading size may be set as "A4", the file format may be set as "PDF", the color type may be set as "Grayscale", and the resolution may be set as "200 dpi".

For example, when the user selects one of the plurality of pieces of preset information 15, the MFP 10 may perform a process based on the selected preset information 15. The MFP 10 may thus save the tasks for the user to input various settings upon each operation, thereby improving usability for the user.

The image reader 17 may generate the image data by reading the information recorded on the reading medium. The image reader 17 may cause the memory 14 to temporarily store the generated image data.

The image forming unit 18 may form an image on a recording medium on the basis of an instruction supplied from the controller 19. Specifically, the image forming unit 18 may form the image on the recording medium on the basis of the print data that is transmitted from the electronic device and is received by the communicator 11, for example. The electronic device transmitting the print data may be the personal computer 7 or any other device in this example. Alternatively, the image forming unit 18 may form the image on the recording medium on the basis of the image data generated by the image reader 17, for example.

The controller 19 may control the operation of the MFP 10. The controller 19 may include hardware or a processor that is able to execute a program, for example.

The personal computer 7 may be a desktop personal computer, for example. The personal computer 7 may communicate with the wired network communicator 111 in the communicator 11 by means of the wired LAN. The computer name, i.e., the server name, of the personal computer 7 may be set as "PC1" in this example. The personal computer 7 may perform communication by means of the protocol "CIFS" and the port "445" in this example. The personal computer 7 may include a shared folder that is accessible by the MFP 10. The name of the shared folder may be set as "Folder1" in this example. The MFP 10 may be allowed to access the shared folder by means of the user name "XXXX" and the password "YYYY". Accordingly, for example, when the MFP 10 performs the scan-to-server process by means of the preset information 151 illustrated in FIG. 2, the MFP 10 may transmit the image data to the shared folder "Folder1" of the personal computer 7.

The personal computer 8 may be a laptop personal computer, for example. The personal computer 8 may communicate with the wireless network communicator 112 in the communicator 11 by means of the wireless LAN. Specifically, the personal computer 8 may be coupled to the wireless network communicator 112 that operates in the communication mode M2, i.e., the SoftAP mode. The computer name, i.e., the server name, of the personal computer 8 may be set as "PC2" in this example.

The smartphone 9 may communicate with the wireless communicator 113 in the communicator 11 by means of Bluetooth. The computer name, i.e., the server name, of the smartphone 9 may be set as "PHONE1" in this example.

The MFP 10 may correspond to an "information processor" according to one specific but non-limiting embodiment of the technology. The communicator 11 may correspond to a "communicator" according to one specific but non-limiting embodiment of the technology. The preset information 151 may correspond to a "parameter set" according to one specific but non-limiting embodiment of the technology. For example, the personal computer 8 may correspond to a "first electronic device" according to one specific but non-limiting embodiment of the technology, and the server name "PC2" of the personal computer 8 may correspond to a "first address parameter" according to one specific but non-limiting embodiment of the technology. For example, the smartphone 9 may correspond to a "second electronic device" according to one specific but non-limiting embodiment of the technology, and the server name "PHONE1" of the smartphone 9 may correspond to a "second address parameter" according to one specific but non-limiting embodiment of the technology. For example, the personal computer 7 may correspond to a "third electronic device" according to one specific but non-limiting embodiment of the technology, and the server name "PC1" of the personal computer 7 may correspond to a "third address parameter" according to one specific but non-limiting embodiment of the technology. The setting of the protocol in the communication setting A1 may correspond to a "protocol parameter" according to one specific but non-limiting embodiment of the technology.

[Operations and Workings]

Operations and workings of the information processing system 1 according to the first example embodiment are described below.

[Outline of Overall Operation]

Referring to FIG. 1, an outline of an overall operation of the information processing system 1 is described below. The communicator 11 in the MFP 10 communicates with an electronic device, and may thereby perform an operation such as reception of the print data and transmission of the image data generated by the MFP 10, for example. Specifically, the wired network communicator 111 may communicate, for example, with the personal computer 7 by means of the wired LAN. The wireless network communicator 112 may communicate, for example, with the personal computer 8 by means of the wireless LAN. The wireless communicator 113 may communicate, for example, with the smartphone 9 by means of Bluetooth. The display 12 may display, for example, the state of the MFP 10 and the menu screen. The operation unit 13 may receive the operation performed by the user. The memory 14 may store, for example, various types of setting information of the information processing system 1 and reading data read from the reading medium by the image reader 17. The memory 14 may store the plurality of pieces of preset information 15 in this example. The image reader 17 may generate the image data by reading the information recorded on the reading medium. The image forming unit 18 may form the image on the recording medium on the basis of the instruction supplied from the controller 19. The controller 19 may control the operation of the MFP 10.

[Detailed Operation]

Figure 3:
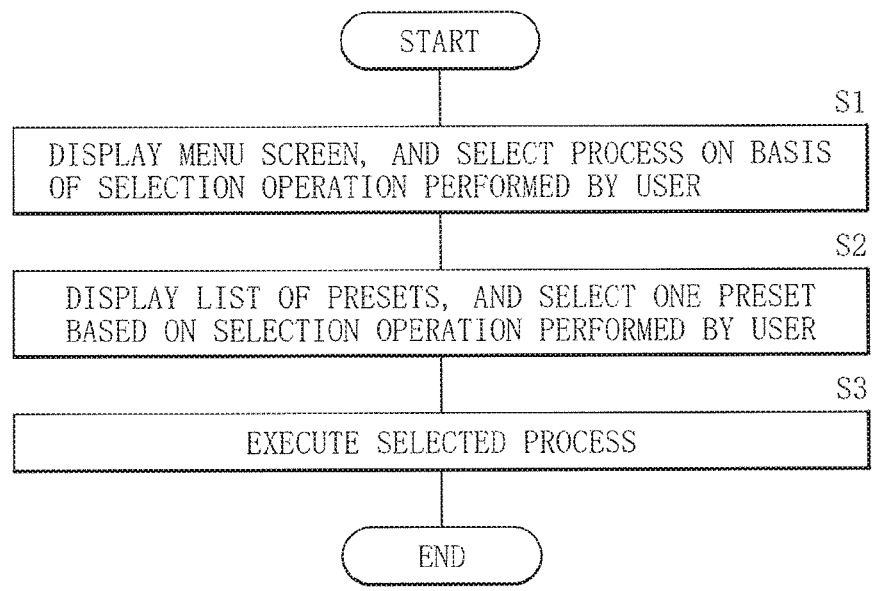
FIG. 3 is a flow chart illustrating an operation example of a multi-function peripheral (MFP) illustrated in FIG. 1.

FIG. 3 illustrates an operation example of the MFP 10. The MFP 10 may cause the user to perform selection of a process, and cause the user to perform selection of a preset on an as-necessary basis. The MFP 10 may thereafter execute the process selected by the user. This operation is described below in greater detail.

First, the MFP 10 may display, on the basis of the instruction supplied from the controller 19, the menu screen that presents processes executable by the MFP 10, and select a process on the basis of the selection operation performed by the user (step S1).

Figure 4:
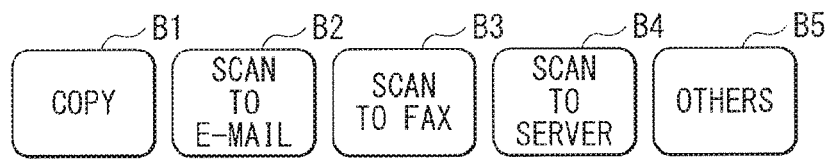
FIG. 4 describes an example of a menu screen of the MFP illustrated in FIG. 1.

FIG. 4 illustrates an example of the menu screen to be displayed by the display 12. The display 12 may display buttons B1 to B5 in this example. The button B1 may be directed to selection of a copy process. The button B2 may be directed to selection of a scan-to-email process. The scan-to-email process may involve generation of the image data by reading the information recorded on the reading medium and transmission of the generated image data via e-mail. The button B3 may be directed to selection of a scan-to-fax process. The scan-to-fax process may involve generation of the image data by reading the information recorded on the reading medium and faxing of the generated image data. The button B4 may be directed to selection of the scan-to-server process. The button B5 may be directed to execution of any other process.

The display 12 may display the menu screen such as the menu screen described above, and let the user to perform selection of a process. The operation unit 13 may receive the selection operation performed by the user.

Thereafter, the MFP 10 may display, on the basis of the instruction supplied from the controller 19, a list of presets related to the process selected in step S1, and perform selection of a preset on the basis of the selection operation performed by the user (step S2).

Figure 5:
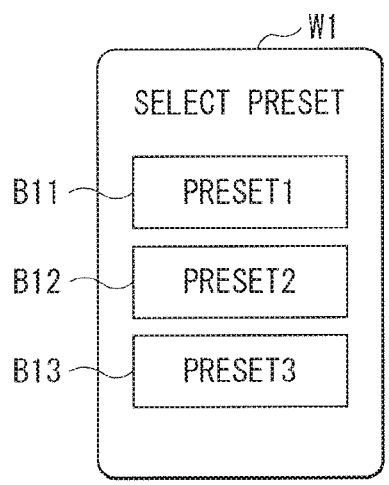
FIG. 5 describes an example of a display screen of the MFP illustrated in FIG. 1.

FIG. 5 illustrates an example of the display screen, which is to be displayed by the display 12, presenting the list of the presets. The display 12 may display a window W1 in which three buttons B11 to B13 are disposed in this example. The button B11 may be directed to selection of the preset information 151 having the preset name "PRESET1". The button B12 may be directed to selection of the preset information 152 having the preset name "PRESET2". The button B13 may be directed to selection of the preset information 153 having the preset name "PRESET3".

The display 12 may display the screen such as the screen described above, and let the user to perform selection of a preset. The operation unit 13 may receive the selection operation performed by the user. The controller 19 may read, from the memory 14, the preset information 15 related to the preset selected by the user.

Thereafter, the MFP 10 may execute the process selected in step S1 (step S3). Upon the execution of the process, the MFP 10 may execute the process on the basis of the preset information 15 that has been read from the memory 14 in step S2. It is to be noted that the MFP 10 may execute the process without using the preset when the selection of the preset has not been performed by the user in step S2.

[Scan-to-Server Process]

A description is given below in greater detail of an operation of performing the process in step S3 in a case where the scan-to-server process has been selected by the user in step S1 and the preset information 151 has been selected by the user in step S2.

Figure 6:
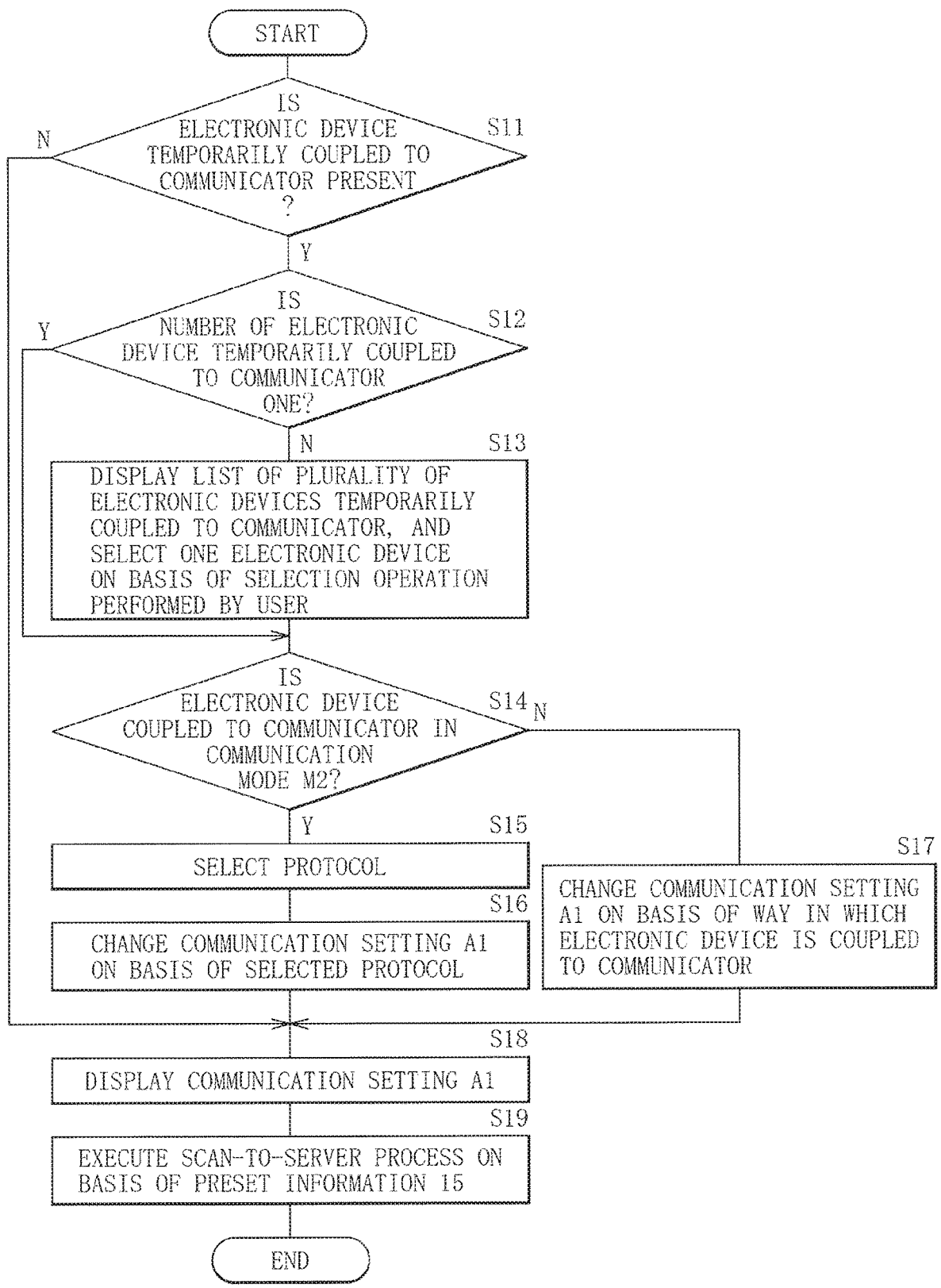
FIG. 6 is a flow chart illustrating an example of a scan-to-server process of the MFP illustrated in FIG. 1.

FIG. 6 illustrates an example of the scan-to-server process. Upon the execution of the scan-to-server process, the MFP 10 may transmit the image data to the personal computer 7 when no electronic device is temporarily coupled to the communicator 11. When a single electronic device is temporarily coupled to the communicator 11, the MFP 10 may transmit the image data to the coupled electronic device. When a plurality of electronic devices are temporarily coupled to the communicator 11, the MFP 10 may transmit the image data to one of the coupled electronic devices. This operation is described below in greater detail.

First, the controller 19 may determine presence or absence of the electronic device that is temporarily coupled to the communicator 11 (step S11). Specifically, the controller 19 may determine whether the wireless network communicator 112 is coupled to an electronic device in the communication mode M2, i.e., the SoftAP mode. The controller 19 may also determine whether the wireless communicator 113 is coupled to an electronic device. In other words, the wireless communicator 113 and the wireless network communicator 112 that operates in the communication mode M2 each may be used upon temporal coupling to an electronic device. Accordingly, the controller 19 may determine presence or absence of the electronic device that is temporarily coupled to the communicator 11 by determining whether one or both of the wireless network communicator 112 and the wireless communicator 113 are coupled to the electronic device. When absence of the electronic device temporarily coupled to the communicator 11 is determined ("N" in step S11), the flow may proceed to step S18.

When presence of the electronic device temporarily coupled to the communicator 11 is determined in step S11 ("Y" in step S11), the controller 19 determines whether the number of the electronic device temporarily coupled to the communicator 11 is one (step S12). When the number of the electronic device temporarily coupled to the communicator 11 is one ("Y" in step S12), the flow may proceed to step S14.

When the number of the electronic device temporarily coupled to the communicator 11 is not one in step S12 ("N" in step S12), the MFP 10 may display a list of the plurality of electronic devices that are temporarily coupled to the communicator 11, and select one of the electronic devices on the basis of the selection operation performed by the user (step S13).

Figure 7:
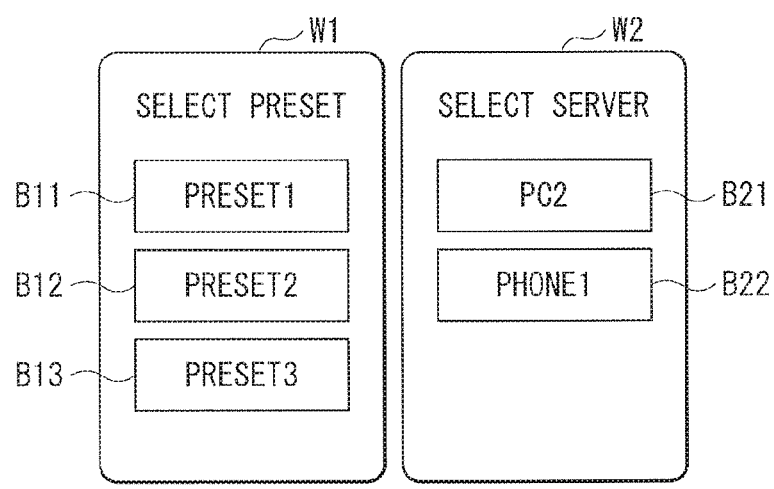
FIG. 7 describes another example of the display screen of the MFP illustrated in FIG. 1.

FIG. 7 illustrates an example of the display screen that displays the list of the plurality of electronic devices. The display 12 may display, next to the window W1, a window W2 in which two buttons B21 and B22 are disposed in this example. The button B21 may be directed to selection of the personal computer 8 having the computer name "PC2". The button B22 may be directed to selection of the smartphone 9 having the computer name "PHONE1". In other words, in this example, the personal computer 8 may be temporarily coupled to the wireless network communicator 112 that operates in the communication mode M2, and the smartphone 9 may be temporarily coupled to the wireless communicator 113. Hence, the display 12 may display the two buttons B21 and B22 that allow the user to select one of the personal computer 8 and the smartphone 9.

The display 12 may display the screen such as the screen described above, and let the user perform selection of the electronic device. The operation unit 13 may receive the selection operation performed by the user.

Thereafter, the controller 19 may determine whether the electronic device is coupled to the communicator 11 in the communication mode M2, i.e., the SoftAP mode (step S14). Specifically, for example, when a single electronic device is temporarily coupled to the communicator 11 ("Y" in step S12), the controller 19 may determine whether that single electronic device is coupled to the communicator 11 in the communication mode M2. Alternatively, when a plurality of electronic devices are temporarily coupled to the communicator 11 ("N" in step S12), the controller 19 may determine whether the electronic device that has been selected by the user in step S13 is coupled to the communicator 11 in the communication mode M2. When the electronic device for which the determination is made is not coupled to the communicator 11 in the communication mode M2 ("N" in step S14), the flow may proceed to step S17.

When the electronic device is coupled to the communicator 11 in the communication mode M2 ("Y" in step S14), the controller 19 may perform selection of the protocol (step S15). Specifically, the wireless network communicator 112 may attempt to communicate with the electronic device by means of various protocols, for example. The controller 19 may perform selection of the protocol on the basis of a result of the attempted communication. Non-limiting examples of the protocol may include CIFS, file transfer protocol (FTP), and hypertext transfer protocol (HTTP).

Thereafter, the controller 19 may change the communication setting A1 in the preset information 15 read from the memory 14, on the basis of the protocol selected in step S15 (step S16). Specifically, first, the wireless network communicator 112 may generate the communication setting A1 directed to execution of communication with the electronic device by means of the protocol selected in step S15. Further, the controller 19 may change the communication setting A1 in the preset information 15 read from the memory 14 to the communication setting A1 generated by the wireless network communicator 112.

FIGS. 8A, 8B, and 8C each illustrate setting examples of the protocol, the server name, the folder path, the file name, and the port number in the communication setting A1.

FIG. 8A illustrates an example in which the protocol is set as "CIFS", the server name is set as "PC2", the folder path is set as "Folder2", the file name is set as "File.pdf", and the port number is set as "445". In other words, in this example, a change may be so made from the original communication setting A1 illustrated in FIG. 2 that the server name is changed from "PC1" to "PC2", and the folder path is changed from "Folder1" to "Folder2". In a case where such a change is made, the path to which the file is transmitted may be "\\PC2\Folder2\File.pdf", for example. The communication setting A1 may be thus changed when the shared folder accessible by the MFP 10 is only "Folder2" in the personal computer 8 having the computer name "PC2", for example.

FIG. 8B illustrates an example in which the protocol is set as "FTP", the server name is set as "PC2", the folder path is set as "Folder1", the file name is set as "File.pdf", and the port number is set as "21". In other words, in this example, a change may be so made from the original communication setting A1 illustrated in FIG. 2 that the protocol is changed from "CIFS" to "FTP", the server name is changed from "PC1" to "PC2", and the port number is changed from "445" to "21". In a case where such a change is made, the path to which the file is transmitted may be "ftp://PC2/Folder1/File.pdf", for example.

FIG. 8C illustrates an example in which the protocol is set as "HTTP", the server name is set as "PC2", the folder path is set as "Folder1", the file name is set as "File.pdf", and the port number is set as "80". In other words, in this example, a change may be so made from the original communication setting A1 illustrated in FIG. 2 that the protocol is changed from "CIFS" to "HTTP", the server name is changed from "PC1" to "PC2", and the port number is changed from "445" to "80". In a case where such a change is made, the path to which the file is transmitted may be "http://PC2/Folder1/File.pdf", for example.

When the electronic device is not coupled to the communicator 11 in the communication mode M2 in step S14 ("N" in step S14), the controller 19 may change the communication setting A1 in the preset information 15 read from the memory 14, on the basis of a way in which the electronic device is coupled to the communicator 11 (step S17). Specifically, for example, when the electronic device is coupled to the communicator 11 by means of Bluetooth, the wireless communicator 113 may generate the communication setting A1 directed to execution of communication with the electronic device by means of Bluetooth. The controller 19 may change the communication setting A1 in the preset information 15 read from the memory 14 to the communication setting A1 generated by the wireless communicator 113.

Thereafter, the display 12 may display the communication setting A1 (step S18). Specifically, for example, when the absence of the electronic device temporarily coupled to the communicator 11 is determined ("N" in step S11), the display 12 may display the communication setting A1 in the preset information 15 read from the memory 14 as it is. Alternatively, when the presence of the electronic device temporarily coupled to the communicator 11 is determined ("Y" in step S11), the display 12 may display the communication setting A1 that has been changed in step S16 or S17.

Thereafter, the MFP 10 may execute the scan-to-server process on the basis of the preset information 15 (step S19). Specifically, the MFP 10 may generate, on the reading setting A2 in the preset information 15, the image data by reading the information recorded on the reading medium, and transmit the generated image data to the electronic device on the basis of the communication setting A1.

The MFP 10 may thus transmit the generated image data to the personal computer 7 upon absence of the electronic device temporarily coupled to the communicator 11 ("N" in step S11), for example. The MFP 10 may transmit the generated data to the personal computer 8 on the basis of the communication setting A1 changed in step S16 when presence of the electronic device temporarily coupled to the communicator 11 is determined ("Y" in step S11) and when the electronic device temporarily coupled to the communicator 11 is the personal computer 8 ("Y" in step S14), for example. Alternatively, the MFP 10 may transmit the generated image data to the smartphone 9 on the basis of the communication setting A1 changed in step S17 when presence of the electronic device temporarily coupled to the communicator 11 is determined ("Y" in step S11) and when the electronic device temporarily coupled to the communicator 11 is the smartphone 9 ("N" in step S14), for example.

This may bring the flow of the process to the end.

The MFP 10 may accept registration of various settings as a preset in advance, thereby saving the tasks for the user to input various settings upon each operation. It is therefore possible to improve usability for the user.

Moreover, the MFP 10 may allow for temporal change of the address of the server to which the image data is to be transmitted when the preset of the scan-to-server process is registered. It is therefore possible to improve usability for the user. Specifically, first, the address of the server to which the image data is to be transmitted in the preset information 151 may be set as the electronic device that is constantly coupled to the MFP 10. The electronic device that is constantly coupled to the MFP 10 may be the personal computer 7 in one example. This allows for the MFP 10 to transmit the image data to the personal computer 7 in a normal condition. Further, for example, when the user wants to temporarily transmit the image data to the personal computer 8, the personal computer 8 may be coupled to the wireless network communicator 112 that operates in the communication mode M2, i.e., the SoftAP mode. This may set the address, of the server to which the image data is to be transmitted, as the personal computer 8 (steps S15 and S16). Alternatively, for example, when the user wants to temporarily transmit the image data to the smartphone 9, the smartphone 9 may be coupled to the wireless communicator 113. This may set the address, of the server to which the image data is to be transmitted, as the smartphone 9 (step S17). This consequently allows the MFP 10 to easily transmit the image data to an electronic device other than the electronic device set in advance. The electronic device set in advance may be the personal computer 7, in this example. The electronic device other than the electronic device set in advance may be the personal computer 8 and the smartphone 9 in this example.

Specifically, for example, when the scan-to-server process is performed without using the preset to transmit the image data to the electronic device such as the personal computer 8 and the smartphone 9, the user is required to input various settings, which may be troublesome. Alternatively, for example, when the image data is once transmitted to the personal computer 7 with using the preset and the same image data is transmitted again to the electronic device such as the personal computer 8 and the smartphone 9 thereafter, the user is required to perform the operation of transmitting the image data again, which may be troublesome. In contrast, the MFP 10 may be able to temporarily transmit the image data to the personal computer 8 by coupling the personal computer 8 to the wireless network communicator 112 that operates in the communication mode M2, for example. The MFP 10 may thus save the tasks for the user, thereby improving usability for the user.

Moreover, the MFP 10 may allow the user to select one electronic device when a plurality of electronic devices are temporarily coupled to the communicator 11. This allows for direct confirmation of the intention of the user. This improves usability for the user.

Moreover, the MFP 10 may perform selection of the protocol when the electronic device is coupled to the communicator 11 in the communication mode M2, i.e., the SoftAP mode, thereby selecting an optimal protocol. This improves usability for the user.

Example Effects

According to the first example embodiment, the address of the server to which the image data is to be transmitted is temporarily changeable. It is therefore possible to improve usability for a user.

According to the first example embodiment, the user is allowed to select one electronic device when a plurality of electronic devices are temporarily coupled to the communicator. It is therefore possible to improve usability for a user.

According to the first example embodiment, selection of the protocol is performed when the electronic device is coupled to the communicator in the communication mode M2, i.e., the SoftAP mode. It is therefore possible to improve usability for a user.

Modification 1-1

The first example embodiment has been described above referring to an example case in which the communication setting A1 is changed in steps S16 and S17, and the image data is transmitted on the basis of the communication setting A1 after the change in step S19; however, this is non-limiting. The image data may be transmitted also on the basis of the communication setting A1 before the change, in which case, the image data may be transmitted also to the personal computer 7 in addition to the electronic device such as the personal computer 8 and the smartphone 9, for example.

Modification 1-2

The first example embodiment has been described above referring to an example case where the address of the server to which the image data is to be transmitted is temporarily changeable upon execution of the scan-to-server process by the MFP 10; however, this is non-limiting. Alternatively, the address of the server to which the image data is to be transmitted may be temporarily changeable upon execution of a process of transmitting, to the electronic device, various pieces of data stored in the memory 14 in the MFP 10.

Modification 1-3

The first example embodiment has been described above referring to an example case where the user is allowed to select one electronic device when a plurality of electronic devices are temporarily coupled to the communicator; however, this is non-limiting. Alternatively, the MFP 10 may determine a distance from the MFP 10 to each of the plurality of electronic devices, and select the electronic device which has the shortest distance, for example. Specifically, the MFP 10 may determine the distance from the MFP 10 to each of the electronic devices on the basis of a level of a signal that is received upon wireless communication with the electronic devices, for example.

Modification 1-4

The first example embodiment has been described above referring to an example case where the communication setting A1 is changed in step S16 or S17. However, the data format of the image data may also be changed upon the change of the communication setting A1, for example. This may allow transmission of image data in data formats that differ between transmission of the image data to the electronic device coupled to the communicator by means of Bluetooth and transmission of the image data to the electronic device that is coupled to the communicator by means of the wireless LAN, for example.

Modification 1-5

The first example embodiment has been described above referring to an example case where the electronic device is temporarily coupled to the communicator by means of, for example, the wireless LAN or Bluetooth; however, this is non-limiting. Alternatively, the electronic device may be temporarily coupled to the communicator by means of near field communication (NFC) in one example. Further, the first example embodiment has been described above referring to an example case where the electronic device is temporarily coupled to the communicator by means of the wireless communication; however, this is non-limiting. Alternatively, the electronic device may be temporarily coupled to the communicator by means of wired communication in one example. A specific but non-limiting example of the wired communication may be a universal serial bus (USB).

Modification 1-6

The first example embodiment has been described above referring to an example case where one of the plurality of electronic devices is selected in step S13; however, this is non-limiting. Alternatively, one or a plurality of electronic devices may be selected in one example.

Other Modifications

Two or more of the foregoing modifications may be applied in any combination.

2. Second Example Embodiment

An information processing system 2 according to a second example embodiment is described below. The second example embodiment may allow for setting of permission or prohibition of making a change in each of setting items in the preset. It is to be noted that a component substantially the same as that of the information processing system 1 according to the first example embodiment described above is denoted with the same numeral, and will not be further described where appropriate.

Figure 9:
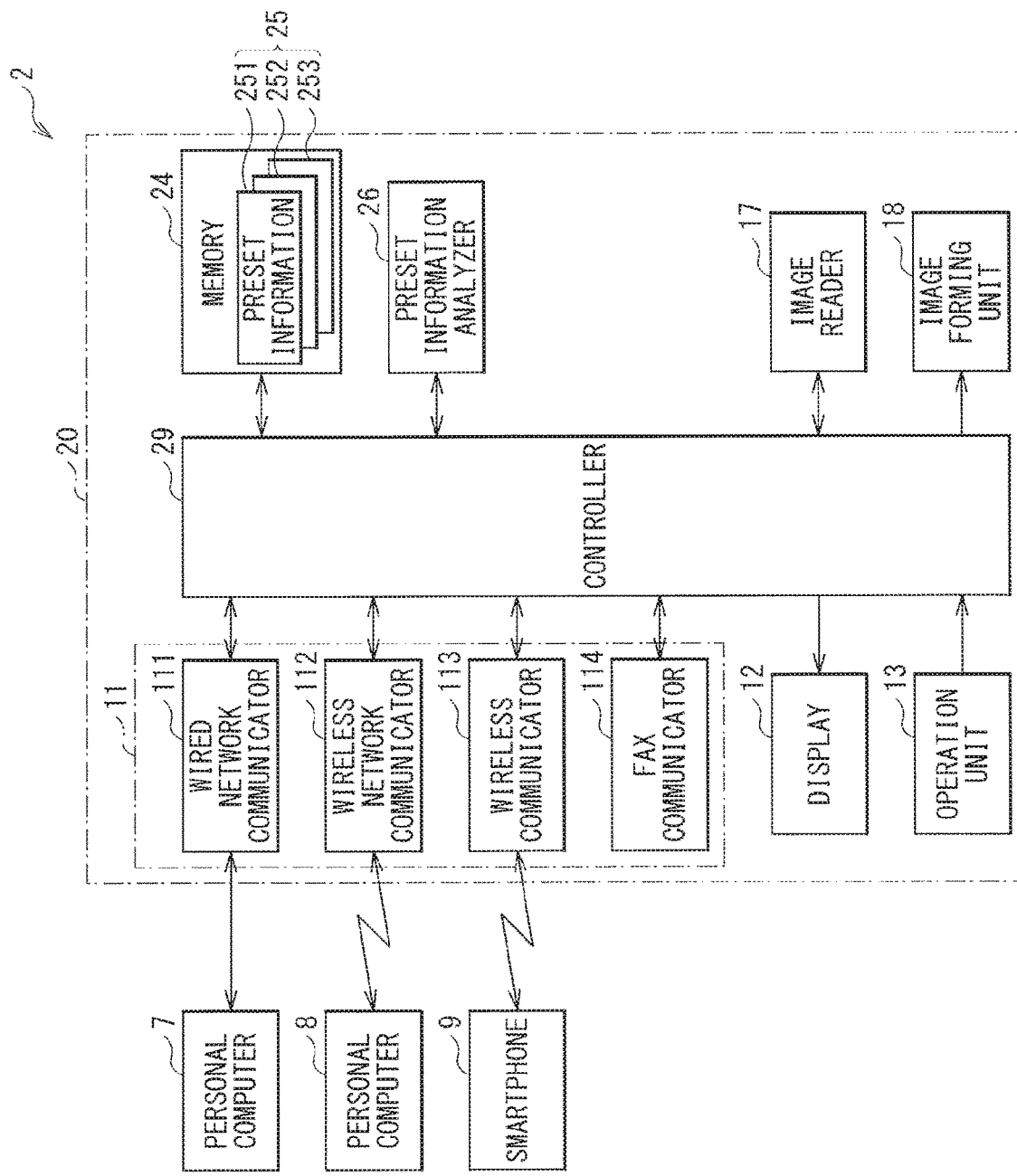
FIG. 9 is a block diagram illustrating a configuration example of an information processing system according to a second example embodiment of the technology.

FIG. 9 illustrates a configuration example of the information processing system 2. The information processing system 2 may include a MFP 20. The MFP 20 may include a memory 24, a preset information analyzer 26, and a controller 29.

The memory 24 may store, for example, various types of setting information of the information processing system 2 and reading data read from the reading medium by the image reader 17, as with the memory 14 according to the first example embodiment. The memory 24 may store, in this example, three pieces of preset information 251 to 253 which may be collectively referred to as preset information 25 hereinafter. The preset information 251 may have a preset name that is set as "PRESET1", the preset information 252 may have a preset name that is set as "PRESET2", and the preset information 253 may have a preset name that is set as "PRESET3".

FIG. 10 illustrates an example of the preset information 251. The preset information 251 may be directed to execution of the scan-to-server process, as with the preset information 151. The preset information 251 may be so designed that permission or prohibition of making a change is allowed to be set for each of the setting items. Making a change is permitted for the protocol, the server name, the folder path, the file name, the port number, the user name, and the password, and making a change is prohibited for the reading size, the file format, and the resolution, in this example. This may be similarly applicable to the preset information 252 and the preset information 253.

The preset information analyzer 26 may analyze whether making a change in each of the setting items in the preset information 25 selected by the user is permitted or prohibited. The preset information analyzer 26 may also supply a result of the analysis to the controller 29.

The controller 29 may control an operation of the MFP 20.

A description is given below in greater detail of a process operation performed in step S3 when the scan-to-server process is selected by the user in step S1 in FIG. 6 and the preset information 251 is selected by the user in step S2 in FIG. 6.

Figure 11:
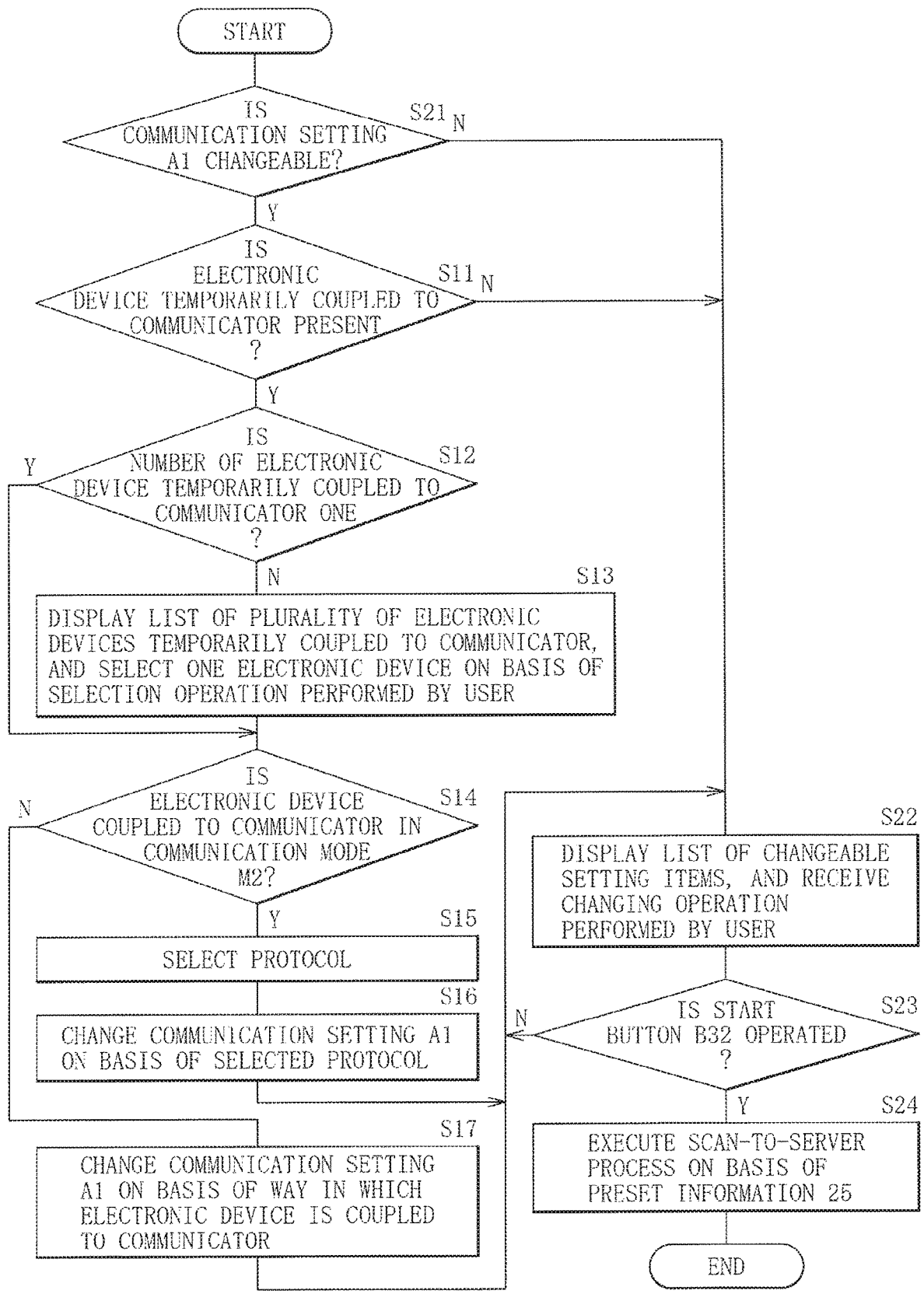
FIG. 11 is a flow chart illustrating an example of a scan-to-server process of the MFP illustrated in FIG. 9.

FIG. 11 illustrates an example of the scan-to-server process.

First, on the basis of an instruction supplied from the controller 29, the preset information analyzer 26 may analyze authority to make a change in each of the setting items in the preset information 25 that has read from the memory 24 in step S2, and thereby determine whether the communication setting A1 is changeable (step S21). When the communication setting A1 is not changeable ("N" in step S21), the flow may proceed to step S22.

When the communication setting A1 is changeable in step S21 ("Y" in step S21), the controller 29 may determine presence or absence of the electronic device that is temporarily coupled to the communicator 11 (step S11). Upon absence of the electronic device that is temporarily coupled to the communicator 11 ("N" in step S11), the flow may proceed to step S22.

When presence of the electronic device that is temporarily coupled to the communicator 11 is determined in step S11 ("Y" in step S11), the MFP 20 may change the communication setting A1 in the preset information 25 read from the memory 24 by operating in a way similar to that of the MFP 10 in the first example embodiment (steps S12 to S17).

Thereafter, the display 12 may display a list of the changeable setting items on the basis of the instruction supplied from the controller 29, and receive an changing operation performed by the user (step S22).

Figure 12:
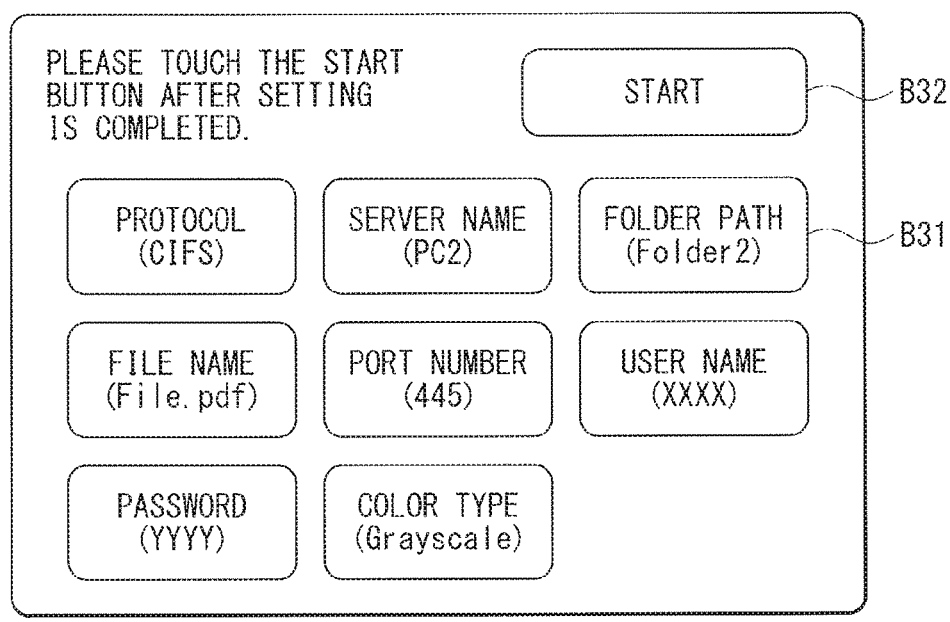
FIG. 12 describes an example of a display screen of the MFP illustrated in FIG. 9.

FIG. 12 illustrates an example of a display screen that displays a list of the changeable setting items. The display 12 may display a plurality of setting change buttons B31 and a start button B32 in this example. The display 12 may display eight change buttons B31 as the plurality of setting change buttons B31 in this example. The setting change buttons B31 each may be directed to selection of the setting item. Referring to FIG. 10, making a change is permitted for eight setting items, which are the protocol, the server name, the folder path, the file name, the port number, the user name, the password, and the color type, in this example. Hence, the display 12 may display the eight setting change buttons B31. Each of the setting change buttons 31 may indicate the setting item and a setting value. The user is allowed to change the setting value of the setting item by operating the setting change button B31 related to the setting item which the user wants to change. In this case where the user changes the setting value of the setting item, the controller 29 may change the preset information 25 read from the memory 24. In this example, the personal computer 8 may be coupled to the MFP 20, and the communication setting A1 may be changed to the setting illustrated in FIG. 8A in step S16. The start button B32 may be directed to starting of the process.

Thereafter, the controller 29 may determine whether the start button B32 is operated by the user (step S23). When the start button B32 is not yet operated ("N" in step S23), the flow may return to step S22, and steps S22 and S23 may be performed repeatedly until the start button B32 is operated by the user.

When the start button B32 is operated by the user in step S23 ("Y" in step S23), the MFP 20 may execute the scan-to-server process on the basis of the preset information 25 (step S24).

This may bring the flow to the end.

The MFP 20 may be able to set permission or prohibition of making a change for each of the setting items in the preset information 25 as described above. This makes it possible to display only the changeable setting items in the preset information 25 as illustrated in FIG. 12, for example. This makes it easier for the user to find the setting item which the user wants to change. This also makes it possible to save tasks for the user to think about the setting which requires a change even when the user is not familiar to the process corresponding to the preset information 25. The process corresponding to the preset information 25 may be the scan-to-server process in this example. Moreover, in an example case where making a change is prohibited for all of the setting items, the MFP 20 may be able to promptly execute the process on the basis of the preset information 25 read from the memory 24, without putting any load on the user. The MFP 20 may thus reduce the load on the user. As a result, it is possible to improve usability for the user.

According to the second example embodiment, permission or prohibition of making a change is settable for each of the setting items as described above. It is therefore possible to improve usability for a user. Other effects may be similar to those according to the first example embodiment described above.

Modification 2-1

Each of the modifications of the first example embodiment described above is applicable to the information processing system 2 according to the second example embodiment described above.

The technology has been described above with reference to some example embodiments and the modifications thereof. However, the technology is not limited to the example embodiments and the modifications thereof described above, and may be modified in a variety of ways.

For example, the technology has been applied to the MFP in the example embodiments described above; however, this is non-limiting. Alternatively, the technology may be applied to an image reading apparatus in one example. Moreover, the technology is not limitedly applied to an apparatus that is related to image data. The technology is also applicable to an apparatus that is related to more general data.

It is possible to achieve at least the following configurations from the above-described example embodiments of the invention.

(1)

An information processor including:
a communicator that communicates with a first electronic device, and thereby generates a first address parameter corresponding to the first electronic device;
a memory that stores a parameter set including a plurality of parameters, the parameter set being adapted to perform a first process including a process that causes the communicator to transmit data; and
a controller that controls, on a basis of the parameter set and the first address parameter, the first process when the first address parameter is generated by the communicator.

(2)

The information processor according to (1), wherein
the communicator further communicates with a second electronic device, and thereby generates a second address parameter corresponding to the second electronic device, and,
when the first address parameter and the second address parameter are generated by the communicator, the controller selects one of the first address parameter and the second address parameter, and controls the first process on a basis of the parameter set and the selected one of the first address parameter and the second address parameter.

(3)

The information processor according to (2), wherein the controller selects one of the first address parameter and the second address parameter by causing a user to select one of the first electronic device and the second electronic device.

(4)

The information processor according to (2), wherein
the communicator further determines a first distance from the information processor to the first electronic device by communicating with the first electronic device, and determines a second distance from the information processor to the second electronic device by communicating with the second electronic device, and the controller selects the first address parameter when the first distance is shorter than the second distance, and selects the second address parameter when the second distance is shorter than the first distance.

(5)

The information processor according to any one of (2) to (4), further including a display that displays the selected one of the first address parameter and the second address parameter.

(6)

The information processor according to any one of (1) to (5), wherein the communicator generates a protocol parameter by communicating with the first electronic device, and controls the first process on a basis of the generated protocol parameter in addition to the parameter set and the first address parameter, the protocol parameter indicating a protocol to be used upon communicating.

(7)

The information processor according to (6), wherein the communicator attempts to communicate with the first electronic device with a plurality of protocols, and generates the protocol parameter on a basis of a result of the communication that is performed with the first electronic device with the plurality of protocols.

(8)

The information processor according to any one of (1) to (7), wherein the parameters include a third address parameter corresponding to a third electronic device, and, when the first address parameter is generated by the communicator, the controller temporarily changes the parameter set by temporarily replacing the third address parameter included in the parameter set with the first address parameter, and controls the first process on a basis of the parameter set changed temporarily.

(9)

The information processor according to any one of (1) to (7), wherein the parameters include a third address parameter corresponding to a third electronic device, and, when the first address parameter is generated by the communicator, the controller controls the first process on a basis of the parameter set, and the controller also temporarily changes the parameter set by temporarily replacing the third address parameter included in the parameter set with the first address parameter, and controls the first process on a basis of the parameter set changed temporarily.

(10)

The information processor according to (8) or (9), wherein the controller controls the first process on a basis of the parameter set when the first address parameter is not generated by the communicator.

(11)

The information processor according to any one of (8) to (10), wherein the parameter set includes flag information that indicates one of permission and prohibition of making a change in each of the parameters, and the controller changes each of the parameters on a basis of the flag information.

(12)

The information processor according to (11), further including a display that displays a parameter, out of the parameters, related to the flag information that indicates the permission of making the change.

(13)

The information processor according to any one of (1) to (12), wherein the communicator generates the first address parameter by assigning an address to the first electronic device.

(14)

The information processor according to any one of (1) to (13), further including an image reader, wherein the first process includes a process that causes the image reader to read an image on a medium to be read and thereby generate image data, and a process that causes the communicator to transmit the image data.

According to the information processor of one embodiment of the technology, the first process is controlled on the basis of the parameter set and the first address parameter. It is therefore possible to improve usability for a user.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An information processor comprising:
a network communicator that communicates with a plurality of electronic devices, and thereby acquires a plurality of address parameters corresponding to respective electronic devices, the electronic devices being configured to perform a communication;
a memory that stores a plurality of parameter sets each representing set information, the set information being related to a process that generates image data and performs transmission of the image data through the network communicator;
a display that displays information that lets a user perform a first selection operation and information that lets the user perform a second selection operation, the first selection operation allowing the user to select one of the electronic devices that have performed the communication with the network communicator, the second selection operation allowing the user to select one of the parameter sets that are stored in the memory;
an operation panel that receives the first selection operation and the second selection operation that are performed by the user; and
a controller that controls the transmission of the image data to the one of the electronic devices selected through the first selection operation, on a basis of any of the address parameters that corresponds to the one of the electronic devices that have performed the communication with the network communicator and that is selected through the first selection operation, and on a basis of the set information included in the one of the parameter sets that are stored in the memory and that is selected through the second selection operation, the plurality of electronic devices including a first electronic device and a second electronic device, the plurality of address parameters including a first address parameter that corresponds to the first electronic device, the one of the parameter sets that is selected through the second selection operation including a second address parameter that corresponds to the second electronic device, the network communicator being configured to communicate with the second electronic device, the controller controlling, when the first electronic device is selected through the first selection operation, the transmission of the image data to the first electronic device that corresponds to the first address parameter, on a basis of the first address parameter that corresponds to the first electronic device selected through the first selection operation and on a basis of the set information, excluding the second address parameter, included in the one of the parameter sets that is selected through the second selection operation, and the controller controlling, in absence of the first selection operation, the transmission of the image data to the second electronic device that corresponds to the second address parameter, on a basis of the set information, including the second address parameter, included in the one of the parameter sets that is selected through the second selection operation.

2. The information processor according to claim 1, wherein the network communicator generates a protocol parameter by communicating with the first electronic device, and controls, when the first electronic device is selected through the first selection operation, the transmission of the image data to the first electronic device on a basis of the generated protocol parameter in addition to the first address parameter that corresponds to the first electronic device selected through the first selection operation and the set information, excluding the second address parameter, included in the one of the parameter sets that is selected through the second selection operation, the protocol parameter indicating a protocol to be used upon communicating.

3. The information processor according to claim 2, wherein the network communicator attempts to communicate with the first electronic device with a plurality of protocols, and generates the protocol parameter on a basis of a result of a communication that is performed with the first electronic device with the plurality of protocols.

4. The information processor according to claim 1, wherein the controller, when the first electronic device is selected through the first selection operation, temporarily changes the second address parameter included in the selected one of the parameter sets that is selected through the second selection operation to the first address parameter that corresponds to the first electronic device selected through the first selection operation, and controls the transmission of the image data to the first electronic device on a basis of the one of the parameter sets changed temporarily.

5. The information processor according to claim 1, wherein the controller, when the first electronic device is selected through the first selection operation, controls the transmission of the image data to the second electronic device on a basis of the selected one of the parameter sets that is selected through the second selection operation, and also temporarily changes the second address parameter included in the selected one of the parameter sets that is selected through the second selection operation to the first address parameter that corresponds to the first electronic device selected through the first selection operation, and controls the transmission of the image data to the the first electronic device on a basis of the one of the parameter sets changed temporarily.

6. The information processor according to claim 4, wherein the parameter sets each include a plurality of parameters and flag information that indicates one of permission and prohibition of making a change in each of the parameters, and the controller changes each of the parameters on a basis of the flag information.

7. The information processor according to claim 6, wherein the display displays a parameter, out of the parameters, related to the flag information that indicates the permission of making the change.

8. The information processor according to claim 1, wherein the network communicator acquires the address parameters by assigning addresses to the respective electronic devices.

9. The information processor according to claim 1, further comprising an image reader, wherein the parameter sets include a parameter set that represents a process that causes the image reader to read an image on a medium to be read and thereby generate the image data, and that causes the network communicator to transmit the image data.

10. A method of transmitting image data to an electronic device, the method comprising:

communicating with a plurality of electronic devices, and thereby acquiring a plurality of address parameters corresponding to respective electronic devices, the electronic devices being configured to perform a communication;

storing a plurality of parameter sets each representing set information, the set information being related to a process that generates image data and performs transmission of the image data through the communicating;

displaying information that lets a user perform a first selection operation and information that lets the user perform a second selection operation, the first selection operation allowing the user to select one of the electronic devices, the second selection operation allowing the user to select one of the parameter sets;

receiving the first selection operation and the second selection operation that are performed by the user; and performing a transmission control that controls the transmission of the image data to the one of the electronic devices selected through the first selection operation, on a basis of any of the address parameters that corresponds to the one of the electronic devices selected through the first selection operation, and on a basis of the set information included in the one of the parameter sets that is selected through the second selection operation, the plurality of electronic devices including a first electronic device and a second electronic device, the plurality of address parameters including a first address parameter that corresponds to the first electronic device, the one of the parameter sets that is selected through the second selection operation including a second address parameter that corresponds to the second electronic device, the communicating with the second electronic device being made possible, the transmission control including controlling, when the first electronic device is selected through the first selection operation, the transmission of the image data to the first electronic device that corresponds to the first address parameter, on a basis of the first address parameter that corresponds to the first electronic device selected through the first selection operation and on a basis of the set information, excluding the second address parameter, included in the one of the parameter sets that is selected through the second selection operation, and controlling, in absence of the first selection operation, the transmission of the image data to the second electronic device that corresponds to the second address parameter, on a basis of the set information, including the second address parameter, included in the one of the parameter sets that is selected through the second selection operation, selected through the second selection operation.

\* \* \* \* \*